(12) United States Patent
Javaudin

(10) Patent No.: US 8,243,833 B2
(45) Date of Patent: Aug. 14, 2012

(54) METHOD FOR TRANSMITTING A MULTICARRIER SIGNAL DESIGNED FOR LIMITING INTERFERENCE, SIGNAL, EMITTING DEVICE, RECEIVING METHOD AND DEVICE AND CORRESPONDING COMPUTER PROGRAMS

(75) Inventor: Jean-Philippe Javaudin, Rennes (FR)

(73) Assignee: France Telecom, Paris (FR)

( * ) Notice: Subject to any disclaimer, the term of this patent is extended or adjusted under 35 U.S.C. 154(b) by 930 days.

(21) Appl. No.: 12/091,644

(22) PCT Filed: Oct. 24, 2006

(86) PCT No.: PCT/EP2006/067716
§ 371 (c)(1), (2), (4) Date: Oct. 27, 2008

(87) PCT Pub. No.: WO2007/048790
PCT Pub. Date: May 3, 2007

(65) Prior Publication Data
US 2009/0213949 A1    Aug. 27, 2009

(30) Foreign Application Priority Data
Oct. 26, 2005    (FR) ...................................... 05 10964

(51) Int. Cl.
*H04L 27/28*    (2006.01)
(52) U.S. Cl. ...................................................... 375/260
(58) Field of Classification Search .......... 375/260–261, 375/285, 298; 370/206–208
See application file for complete search history.

(56) References Cited

U.S. PATENT DOCUMENTS

| 6,278,686 | B1 | 8/2001 | Alard | |
|---|---|---|---|---|
| 6,961,364 | B1 * | 11/2005 | Laroia et al. | 375/132 |
| 7,061,997 | B1 * | 6/2006 | Eberlein et al. | 375/332 |
| 7,248,841 | B2 * | 7/2007 | Agee et al. | 455/101 |
| 7,272,188 | B2 | 9/2007 | Lacroix-Penther et al. | 375/260 |
| 7,292,642 | B2 | 11/2007 | Gonzalez et al. | 375/261 |

FOREIGN PATENT DOCUMENTS

| FR | 2733869 A1 | 11/1996 |
|---|---|---|
| FR | 2 814 302 | 3/2002 |
| FR | 2 814 303 | 3/2002 |
| WO | WO 9635278 | 11/1996 |

OTHER PUBLICATIONS

International Search Report from counterpart foreign Application No. PCT/EP2006/067716.
International Preliminary Report on Patentability from counterpart foreign Application No. PCT/EP2006/067716.

* cited by examiner

*Primary Examiner* — Khanh C Tran
(74) *Attorney, Agent, or Firm* — David D. Brush; Westman, Champlin & Kelly, P.A.

(57) ABSTRACT

A method is provided for transmitting a multi-carrier signal formed of a temporal succession of symbols comprised of a set of data elements. The method includes: calculating an interference affecting a set of at least two data elements which are to be protected and are spaced out two by two from no more than one time carrier and no more than one frequency carrier, the interference taking into account the value of the data elements to be protected and values of the data elements of a contour ring consisting of carriers immediately adjacent to data elements to be protected, and; determining at least one value to be attributed to at least one data element of the contour ring for reducing, upon reception, the calculated interference.

11 Claims, 4 Drawing Sheets

METHOD FOR TRANSMITTING A MULTICARRIER SIGNAL DESIGNED FOR LIMITING INTERFERENCE, SIGNAL, EMITTING DEVICE, RECEIVING METHOD AND DEVICE AND CORRESPONDING COMPUTER PROGRAMS

CROSS-REFERENCE TO RELATED APPLICATIONS

This Application is a Section 371 National Stage Application of International Application No. PCT/EP2006/067716, filed Oct. 26, 2006 published as WO 2007/048790 on May 3, 2007, not in English.

FIELD OF THE DISCLOSURE

The field of the disclosure is that of the transmission and broadcasting of digital information, especially at high bit rates, on a limited frequency band.

More specifically, the disclosure relates to a technique for the transmission of a multicarrier signal enabling the reduction at reception of inter-symbol interference affecting the multicarrier signals without any need to introduce a guard interval (also called a cyclic prefix).

Thus, the technique of the disclosure is especially well suited to the transmission of multicarrier signals having undergone OFDM/OQAM (orthogonal frequency division multiplexing/offset quadrature amplitude modulation) type modulation for which the carriers are shaped by the Iota prototype function. It may be recalled that the Iota prototype function described for example in the patent document No. FR 2 733 869 has the characteristic of being identical to its Fourier transform. The disclosure can naturally also be applied to any other type of multicarrier modulation, especially of the OFDM/OQAM type, whatever the associated prototype function.

The disclosure can be applied especially in a radio mobile context and makes it possible to tackle problems relating to inter-symbol interference and to the Doppler effect.

The disclosure can be applied especially but not exclusively in the context of an MISO or MIMO (multiple input single output or multiple input multiple output) type multi-antenna system implementing at least two antennas at transmission.

BACKGROUND OF THE DISCLOSURE

To tackle the problems related to inter-symbol interference (ISI) and the Doppler effect, there is a well-known way of adding a guard interval, in which no information is transmitted.

A major drawback of this technique is that it has reduced spectral efficiency, since no payload information is transmitted during this interval. A technique is therefore sought to reduce the ISI affecting the multicarrier signals without introducing any guard interval.

A technique has been proposed in the French patent document FR 2 814 302 filed on behalf of the present Applicant for the construction of a multicarrier signal, for example of the OFDM/OQAM type, that does not necessitate the introduction of a guard interval and makes it possible to limit the interference affecting the pilots. It may be recalled especially that OFDM/OQAM (offset QAM) modulation is an alternative to the classic OFDM modulation and, unlike OFDM modulation, does not require any guard interval.

In this technique, the multicarrier signal, comprising pilots and informative data elements is built by fixing the value of at least one of the informative data elements on a ring comprising the carriers that are immediately adjacent to a pilot so as to reduce the interference affecting this pilot at reception.

Indeed, the inventors have noted that the intrinsic interference affecting the reference carriers of the time-frequency plane, called pilots, depends chiefly on the carriers that are immediately adjacent to each of the pilots.

Thus, as described in detail in Section 2 below, which is an integral part of the present patent application, the interference $C_{m_0,n_0}^1$ due to the eight carriers forming a ring surrounding a pilot, called a first ring, in the French patent application FR 2 814 302 can be written as follows:

$$C_{m_0,n_0}^1 = \sum_{(m,n) \in \Omega_{m_0,n_0}^1} a_{m,n} \int_{\mathcal{H}} g_{m,n}(t) g_{m_0,n_0}^*(t) dt$$

with:
- $a_{m,n}$ being the real symbols sent by the $m^{th}$ sub-carrier of the $n^{th}$ symbol time;
- $\Omega_{m_0,n_0}^1$ being indices of the carriers immediately adjacent to a pilot;
- $g_{m,n}(t)$ the time-shifted and frequency-shifted versions of the prototype function $g(t)$.

The inventors have therefore sought to cancel the intrinsic interference due at least to the first ring on certain reference carriers of the time-frequency plane, especially for an OFDM/OQAM type multicarrier signal.

According to the technique presented in the document, a relationship between the carriers of the first ring surrounding a pilot is introduced to eliminate the intrinsic interference locally (and almost totally) and enable an accurate estimation of the propagation channel.

In other words, this document proposes a technique for the reduction of interference phenomena implementing a multicarrier modulation with distributed pilots, in which one or more constraints are imposed on the value of one or more informative data elements that are to be transmitted, so as to reduce the ISI detrimental to the implementation of an accurate channel estimation.

Thus, the interference affecting a given pilot due to the carriers belonging to the first ring surrounding this pilot, i.e. due to the carriers that are immediately adjacent to the pilot considered, in the time space on the one hand and in the frequency space on the other hand, is cancelled.

However, one major drawback of this technique is that it is not suitable when the number of pilots increases. Now, in order to improve the signal-to-noise ratio, it is advantageous to increase the number of pilots sent out per antenna, scattered in the multicarrier signal.

Unfortunately, in this prior art technique of generation of a multicarrier signal, the rings surrounding each of the pilots must be disjoined, and this makes it necessary for the pilots to be separated by at least two carriers in time and/or in frequency.

More specifically, as illustrated with reference to FIG. 7, increasing the number of pilots gives rise to an increase in the number of rings around these pilots and the number of fixed values.

Thus, the use of a ring around each of the pilots soon induces a problem of space in the time-frequency plane. In other words, increasing the number of pilots give rise to a more important use of the time-frequency resource.

Similarly, this prior art technique is not suited to transmission in a MIMO or MISO type system in which several pilots associated with different antennas are positioned at distinct locations in the time-frequency plane in order to estimate the propagation channels between the transmission and reception antennas.

Indeed, in the context of multi-antenna transmission, pilots are associated with each of the transmit antennas thus increasing the number of pilots.

In order to enable accurate estimation of the propagation channel, it is therefore indispensable that, at the time-frequency location of a pilot of an antenna, there is no interference or jamming induced by the neighboring antenna.

Unfortunately, the prior art technique does not deal with this case and is consequently ill-suited to transmission with several antennas.

SUMMARY

An aspect of the disclosure relates to a method for the transmission of a multicarrier signal formed by a temporal succession of symbols comprising a set of data elements, each of the data elements modulating a carrier frequency of the signal, said data elements comprising firstly reference data elements called pilots, the value at transmission of at least certain of these pilots being known to at least one receiver designed to carry out a reception of this signal and secondly informative data elements, the value at transmission of the informative data elements being not known a priori to said receiver or receivers, one of the carrier frequencies modulated at a given instant by one of the data elements being called a carrier.

According to an embodiment of the invention, a transmission method of this kind implements:

- a step of computation of an interference affecting a set of at least two data elements to be protected, the data elements to be protected being spaced out two by two from at most one carrier in time and at most one carrier in frequency, said interference taking account of the value of the data elements to be protected and of the values of the data elements of a contour ring constituted by the carriers that are immediately adjacent to the data elements to be protected; and
- a step of determining at least one value to be assigned to at least one data element of the contour ring, to reduce said computed interference at reception.

Thus, an embodiment of the invention relies on a wholly novel and inventive approach to the computation and reduction of an interference affecting data elements to be protected from a multicarrier signal in order to enable accurate estimation of the propagation channel, without wasting the time-frequency resource.

Indeed, the technique of an embodiment of the invention makes it possible especially, as compared with the prior art technique, to optimize the time-frequency resource since it does not require the use of a guard interval, during which no payload information is transmitted nor the use of a ring surrounding each of the pilots, which would soon introduce a problem of place in the time-frequency plane.

An embodiment of the invention, through the compactness of the contour ring used, is thus well-suited to multi-antenna transmission implementing at least two transmit antennas and to single-antenna transmission for which the number of pilots distributed in the multicarrier signal is great, so that several pilots are positioned at time-frequency locations spaced out by at least one carrier in time and/or in frequency.

More specifically, the data elements to be protected are considered to be separated by at most one carrier in time and/or in frequency, signifying that the data elements to be protected are spaced out two by two by at most one carrier in time and/or one carrier frequency.

It is assumed especially that the propagation channel between a transmit antenna and a reception antenna is identical for all the data elements of the contour ring and the data elements to be protected.

Advantageously, each of the data elements to be protected being surrounded by a proximity ring consisting of carriers that are immediately adjacent to the data elements to be protected, the steps of computation and determining are implemented in the form of at least one iteration of the following sub-steps:

- computation of a partial interference affecting one of the data elements to be protected, the partial interference taking account of the value of the data element to be protected and of the values of the data elements of the proximity ring surrounding the data element to be protected; and
- determining at least one value to be assigned to at least one data element of the proximity ring that does not belong to the set of data elements to be protected, to reduce the computed partial interference at reception, a following iteration taking account of the values assigned during a current iteration, so as to determine the values to be assigned to at least one data element of the contour ring.

Thus, according to one alternative embodiment, the interference cancellation technique is applied step by step to each of the data elements to be protected, in considering, for each data element to be protected, a proximity ring surrounding this element, and in seeking to cancel the partial interference affecting this element.

The first iteration thus enables cancellation of the partial interference affecting a first data element to be protected, in taking account of the value of the data element to be protected and the value of the data elements of its proximity ring, in determining at least one value to be assigned to an element of the proximity ring other than another data element to be protected. Indeed, it is considered that the value of a data element to be protected cannot be modified.

These steps are then reiterated for each data element in taking account of the values assigned during previous iterations. Consequently, if it is sought to cancel or at least reduce the partial interference affecting a second data element to be protected, a value could be assigned to at least one element of the proximity ring surrounding this second data element to be protected other than another data element to be protected or other than a data element for which the value has already been determined during a previous iteration.

In performing this procedure in this way step by step, it is possible to determine the values to be assigned to at least one data element of the contour ring constituted by the carriers that are immediately adjacent to the data elements to be protected, so as to cancel or at least reduce the interference affecting the set of data elements to be protected.

Preferably, the multicarrier signal being sent by a first source and being called a first signal, the data elements to be protected comprise:

- a first set of at least one pilot of the first signal;
- a second set of at least one data element to be protected that is positioned in the time-frequency space at least one location corresponding to the location of at least one pilot of at least one second multicarrier signal sent out by at least one second source and having the same structure as the first signal.

An embodiment of the invention thus finds applications in multi-antennas systems implementing 2, 3, 4 or more transmit antennas.

It is thus considered for a transmit antenna that the data elements to be protected belong either to a first set or to a second set.

More specifically, the data elements to be protected, for a first transmit antenna sending out a first signal, are pilots of the first signal (first set) or data elements positioned in the time-frequency space at the locations corresponding to the locations of pilots of a second signal sent out by a second antenna, and/or to the locations of pilots of a third signal set out by the third antenna etc. (second set).

In other words, the data elements to be protected of the second set are used to cancel the interference affecting the pilots associated with an antenna other than the one with which the pilots of the first set are associated.

Advantageously, the data elements to be protected of the second set are informative data elements, the data elements to be protected of the first and second sets forming a sequence orthogonal to each sequence of at least one second signal, positioned at the corresponding locations in the time-frequency space.

Thus, the sequence formed by the data elements to be protected of the first and second sets of a first multicarrier signal is orthogonal to each of the sequences carried by each of the other multicarrier signals, for example a second, a third and a fourth multicarrier signal in a system implementing four transmit antennas, sequences that are positioned at the same locations in the time-frequency space.

Since these different sequences are orthogonal to each other, the retrieval of the data elements at reception is done without difficulty.

Preferably, the multicarrier signal is of an OFDM/OQAM type.

Indeed, the emphasis is placed more particularly on the reduction of the intrinsic inter-symbol interference and/or inter-carrier interference for real-time modulations, especially with a view to a channel estimation by scattered pilots. Indeed, the channel estimation process is more difficult for OFDM/OQAM type signals for which all that is available is an orthogonality of the translated terms in the real sense. It is therefore particularly interesting to try and improve the channel estimation for multicarrier signals of this type.

Advantageously, the pilots of the multicarrier signal carry real values. This is verified especially when the multicarrier signal is of an OFDM/OQAM type.

An embodiment of the invention also relates to a multicarrier signal formed by a temporal succession of symbols comprising a set of data elements, each of the data elements modulating a carrier frequency of the signal, said data elements comprising firstly reference data elements called pilots, the value at transmission of at least certain of these pilots being known to at least one receiver designed to carry out a reception of this signal and secondly informative data elements, the value at transmission of the informative data elements being not known a priori to said receiver or receivers, one of the carrier signals modulated at a given instant by one of the data elements being called a carrier.

According to an embodiment of the invention, the signal comprises a set of at least two data elements to be protected, the data elements to be protected being spaced out two by two from at most one carrier in time and at most one carrier in frequency, at least one value being assigned to at least one data element of a contour ring constituted by the carriers that are immediately adjacent to the data elements to be protected to reduce an interference affecting the data elements to be protected, at reception, the interference taking account of the value of the data elements to be protected and of the values of the data elements of the contour ring.

More specifically, it is considered that the data elements to be protected are separated by at most one carrier in time and/or in frequency, signifying that the data elements to be protected are spaced out two by two by at most one carrier in time and/or one carrier in frequency.

Advantageously, the data elements to be protected of the multicarrier signal, called a first signal, comprise:
  a first set of at least one pilot of the first signal;
  a second set of at least one data element to be protected that is positioned in the time-frequency space at least one location corresponding to the location of at least one pilot of at least one second multicarrier signal sent out by at least one second source and having the same structure as the first signal, Preferably, the multicarrier signal is of an OFDM/OQAM type.

An embodiment of the invention also pertains to a method of reception of a multicarrier signal formed by a temporal succession of symbols comprising a set of data elements.

According to an embodiment of the invention, the received signal comprising at least two data elements to be protected spaced out two by two from at most one carrier in time and at most one carrier in frequency, a processing operation being done before transmission on the signal so as to assign at least one value to at least one data element of a contour ring constituted by the carriers that are immediately adjacent to the data elements to be protected to reduce an interference affecting the data elements to be protected, the reception method implements:
  a step of estimation of the transfer function of a transmission channel, from at least certain of the data elements to be protected; and
  a step of retrieval of the data elements of the contour ring implementing a processing that is the reverse of the processing done before transmission.

It can thus be noted that the value of at least certain pilots is known to a receiver.

In other words, a receiver knows the value of at least certain pilots conveyed by the multicarrier signal and especially the value of the pilots that it wishes to use to carry out an estimation of the propagation channel between a transmit antenna and this receiver and possibly the value of the pilots sent by at least one other transmit antenna interfering with these pilots.

It can also be noted that in a particular application of an embodiment of the invention, for example in the DVB-T context, certain pilots convey a piece of information and are therefore not necessarily known to the receiver or receivers.

An embodiment of the invention also concerns a device for the transmission of a multicarrier signal formed by a temporal succession of symbols comprising a set of data elements.

According to an embodiment of the invention, such a device comprises:
  means of computation of an interference affecting a set of at least two data elements to be protected, the data elements to be protected being spaced out two by two from at most one carrier in time and at most one carrier in frequency, the interference taking account of the value of the data elements to be protected and of the values of the data elements of a contour ring constituted by the carriers that are immediately adjacent to the data elements to be protected;

means of determining at least one value to be assigned to at least one data element of the contour ring, to reduce said computed interference at reception.

Such a device can implement especially the transmission method as described here above.

An embodiment of the invention also pertains to a device for the reception of a multicarrier signal formed by a temporal succession of symbols comprising a set of data elements.

According to an embodiment of the invention, the received signal comprising at least two data elements to be protected spaced out two by two from at most one carrier in time and at most one carrier in frequency, a processing operation being done before transmission on the signal so as to assign at least one value to at least one data element of a contour ring constituted by the carriers that are immediately adjacent to the data elements to be protected to reduce an interference affecting the data elements to be protected, the device comprises:

means of estimation of the transfer function of a transmission channel, from at least certain of the data elements to be protected; and means of retrieval of the data elements of the contour ring implementing a processing that is the reverse of the processing done before transmission.

Such a device can implement especially the reception method as described here above.

An embodiment of the invention also relates to a computer program product downloadable from a communications network and/or stored on a computer-readable carrier and/or executable by a microprocessor comprising program code instructions for the implementation of the method of transmission as described here above and a computer program product downloadable from a communications network and/or stored on a computer-readable carrier and/or executable by a microprocessor comprising program code instructions for the implementation of the method of reception as described here above.

BRIEF DESCRIPTION OF THE DRAWINGS

Other features and advantages shall appear more clearly from the following description of a preferred embodiment, given by way of a simple non-exhaustive and illustrative example, and from the appended drawings, of which

DETAILED DESCRIPTION OF ILLUSTRATIVE EMBODIMENTS

1. Description of an Embodiment of the Invention
1.1 General Principle

The general principle of an embodiment of the invention is based on the computation of an interference affecting a set formed by at least two data elements to be protected and the determining of at least one value to be assigned to the data elements of a contour ring surrounding the data elements to be protected, to reduce this interference.

An embodiment of the invention thus enables the cancellation or at least the reduction of an intrinsic interference due at least to the contour ring on certain carriers of the time-frequency network corresponding to data elements to be protected, especially for an OFDM/OQAM type multicarrier signal.

Figure 1:
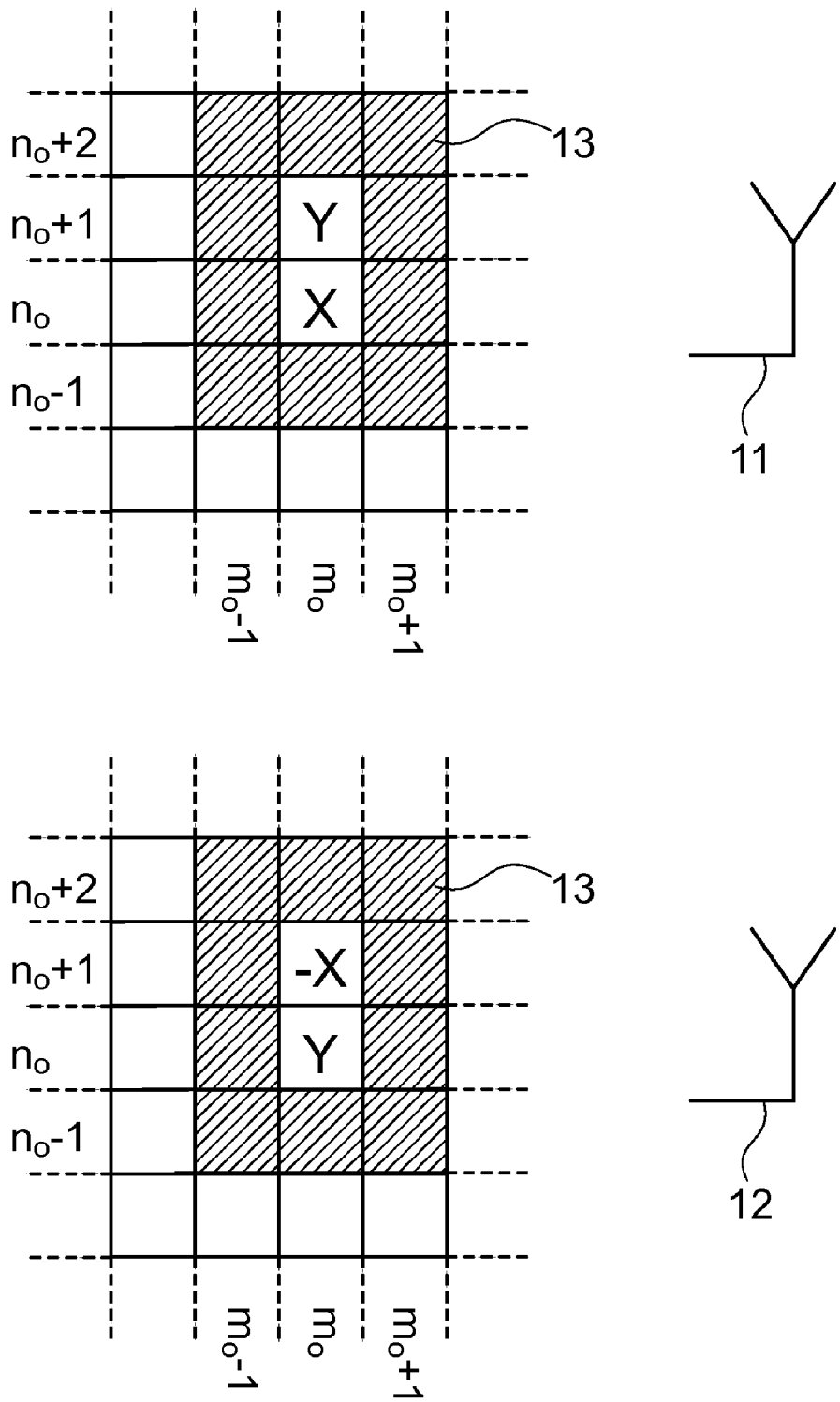
FIG. 1 illustrates the distribution in the time-frequency space of the data elements to be protected of two multicarrier signals sent out by two transmit antennas, and the contour ring surrounding them.

Referring to FIG. 1, a technique is presented for the transmission of a multicarrier signal enabling the reduction at reception of the inter-symbol interference affecting the multicarrier signals according to a preferred embodiment of the invention.

Here below in the document, we shall consider especially an OFDM/OQAM type multicarrier signal as presented in Section 2 of the present patent application.

It is also assumed that the prototype function g(t) associated with the multicarrier signal verifies the properties of the ambiguity functions described in Section 3, which form an integral part of the present patent application.

It is assumed finally that the propagation channel between a transmit antenna and a reception antenna is identical for all the data elements of the contour ring and the data elements to be protected.

FIG. 1 illustrates especially the distribution in the time-frequency space of symbols of the multicarrier signal on a plurality of independently modulated frequency carriers the multicarrier signal being formed by a temporal succession of symbols formed by data elements. The OFDM/OQAM modulation thus subdivides the channel into cells along the time axis (vertical axis) and the frequencies (horizontal axis). In particular, each of the carriers is orthogonal to the previous one.

Each frequency/time cell (for example the cell $(m_0, n_0)$, where $m_0$ corresponds to a frequency and $n_0$ corresponds to a time) has a dedicated carrier assigned to it. A symbol of the multicarrier signal comprises the set of informative elements carried by the set of carriers at an instant t. FIG. 1 illustrates for example the symbols $n_0-1, n_0, n_0+1, \ldots$ Certain carriers carry reference data elements called pilots, the value at transmission of certain pilots being known by at least one receiver designed to carry out a reception of the signal while the other carriers carry informative data elements whose value at transmission is not known, a priori, to these receivers.

It can also be noted that in the particular application of an embodiment of the invention, for example in the DVB-T context, certain pilots convey a piece of information and are therefore not necessarily known to the receiver or receivers.

1.2 Comprehensive Method

FIG. 1 thus illustrates the transmission of two pilots each associated with a transmit antenna in a system comprising two transmit antennas 11 and 12, the two pilots being positioned at neighboring locations in the time-frequency plane.

More specifically, at least one first pilot associated with the first transmit antenna 11 is positioned at the location $(m_0, n_0)$ in the time-frequency space and a second pilot associated with the second transmit antenna 12 is positioned at the location $(m_0, n_0+1)$ in the time-frequency space.

According to an embodiment of the invention, the data elements carried by the carriers situated at the locations corresponding to the cells $(m_0, n_0)$ and $(m_0, n_0+1)$ define the set of the data elements to be protected.

In a first step, an interference affecting the data elements to be protected is computed. More specifically, this interference takes account both of the values of the data elements to be protected and the values of the data elements of a contour ring 13 constituted by carriers that are immediately adjacent to carriers in the time-frequency space of the data elements to be protected.

The contour ring 13 is therefore defined, in the example of FIG. 1, by the ten carriers positioned at the locations $(m_0-1, n_0-1)$, $(m_0, n_0-1)$, $(m_0+1, n_0-1)$, $(m_0+1, n_0)$, $(m_0+1, n_0+1)$, $(m_0+1, n_0+2)$, $(m_0, n_0+2)$, $(m_0-1, n_0+2)$, $(m_0-1, n_0+1)$, $(m_0-1, n_0)$.

It can be noted especially that according to an embodiment of the invention each of the antennas has a contour ring that has the same form and is situated at the same time-frequency locations, enabling cancellation of the interference affecting the data elements to be protected of each of the antennas.

A second step serves to determine a value to be assigned to at least one data element of the contour ring 13, i.e. at least one data element carried by one of the ten carriers referred to here above, enabling the reduction of the computed interference at reception.

To determine the values to be assigned to the elements of the contour ring, it is then necessary to resolve a system of N equations with N unknown quantities, N being the number of data elements to be protected.

It is thus sought to cancel the interference affecting the set of all the data elements to be protected, coming especially from the contour ring, in resolving the following equation:

$$0 = \sum_{(m_j,n_j)\in\Omega\neq\Theta} a_{m_j,n_j} \langle x_{m_j,n_j} | x_{m_i,n_i} \rangle + \sum_{m_k,n_k \in \Theta} a_{m_k,n_k} \langle x_{m_k,n_k} | x_{m_i,n_i} \rangle,$$

with: $\Omega$ the set of locations forming the contour ring;
$(m_i, n_i)$ the location of the data elements to be protected, for i ranging from 1 to N;
$a_{(m_k, n_k)}$ the values of the data elements to be determined of the contour ring, for k ranging from 1 to N, positioned at the locations $(m_k, n_k)$ forming the set $\Theta$.

In other words, in order to improve the propagation channel estimation without reducing the space occupied in the time-frequency plane by the neighbourhood of the data elements to be protected, orthogonal sequences of data elements to be protected are transmitted on each antenna at the time-frequency locations situated within the contour ring 13. For example, as illustrated with reference to FIG. 1, at the time $t_0$ the antenna 11 sends out a data element to be protected having a value X situated at the location $(m_0, n_0)$, and the antenna 12 simultaneously sends out a data element to be protected having a value Y situated at a location $(m_0, n_0)$. At the time $t_1$, the antenna 11 sends out a data element to be protected having a value Y situated at the location $(m_0, n_0+1)$, and the antenna 12 simultaneously sends out a data element to be protected having a value –X situated at the location $(m_0, n_0+1)$.

Hence, on each antenna, sequences of two data elements at the two time-frequency locations situated within the contour ring 13 are transmitted.

The condition on these sequences to enable the retrieval of the values of the channel is that the values of the data elements to be protected are real and that the sequences are orthogonal.

It can be noted especially that the real orthogonal sequences necessarily have the form [X, Y] and $(+/-)$[Y, –X].

According to one advantageous embodiment of the invention, the carrier carrying the value X carries a zero value and the carrier carrying the value Y is a pilot. Thus, a "zero" and a pilot are transmitted in inverting these positions from one antenna to the other. It can be noted especially that in this case, there is no overlapping of the pilots associated with each of the antennas since, in multiple antenna systems, the transmit antennas are synchronized.

1.3 Iterative Method

According to one alternative embodiment, it is also possible to apply the technique of interference cancellation step by step.

To this end, we consider a proximity ring surrounding each of the data elements to be protected.

For example, referring again to FIG. 1, the first pilot associated with the antenna 11 corresponding to the data element to be protected positioned at the time-frequency location $(m_0, n_0)$ is surrounded by the data elements positioned at the locations $(m_0-1, n_0)$, $(m_0, n_0)$, $(m_0+1, n_0)$, $(m_0+1, n_0+1)$, $(m_0+1, n_0+2)$, $(m_0, n_0+2)$, $(m_0-1, n_0+2)$, $(m_0-1, n_0+1)$ forming a first proximity ring associated with this first pilot.

The second pilot associated with the antenna 12 corresponding to the data element to be protected positioned at the time-frequency location $(m_0, n_0+1)$ is surrounded by the data elements positioned at the locations $(m_0-1, n_0)$, $(m_0, n_0)$, $(m_0+1, n_0)$, $(m_0+1, n_0+1)$, $(m_0+1, n_0+2)$, $(m_0, n_0+2)$, $(m_0-1, n_0+2)$, $(m_0-1, n_0+1)$ forming a second proximity ring associated with this second pilot.

In this alternative embodiment, the steps for computing interference and determining at least one value to be assigned to the contour ring 13 are implemented in the following form:

computation of a first partial interference affecting the first pilot, the first partial interference taking account of the value of the first pilot positioned at the location $(m_0, n_0)$ and values of data elements of the first proximity ring; and determining at least one value to be assigned to at least one data element of the first proximity ring that does not belong to the set of data elements to be protected, for the reduction at reception of the partial interference computed. In other words, the method determines at least one value to be assigned to a data element positioned at the location $(m_0-1, n_0-1)$, $(m_0, n_0-1)$, $(m_0+1, n_0-1)$, $(m_0+1, n_0)$, $(m_0+1, n_0+1)$, $(m_0-1, n_0+1)$, $(m_0-1, n_0)$ but not to the data element situated at the location $(m_0, n_0+1)$ because it is a data element to be protected whose value cannot be modified. It is therefore possible to act on these seven values carried by the data elements situated at the above-mentioned seven locations;

computation of a second partial interference affecting the second pilot, the second partial interference taking account of the value of the second pilot positioned at the location $(m_0, n_0+1)$ and the values of these data elements of the second proximity ring; and determining of at least one value to be assigned to at least one data element of the second proximity ring that does not belong to the set of data elements to be protected, and whose value has not been determined during a preceding determining step.

In other words if, during the previous determining step, a value has been assigned to each of the elements of the first proximity ring except for the data elements to be protected (corresponding to the seven above-mentioned values), there remain to be determined the values to be assigned to the remaining elements of the second proximity ring, namely the value of the elements positioned at the locations $(m_0-1, n_0-2)$, $(m_0, n_0+2)$, $(m_0+1, n_0+2)$.

It can especially be noted that this iterative technique could be applied to disjoined proximity rings in a multicarrier system so that, at the time-frequency location of a pilot associated with an antenna, a data element to be protected having zero value is sent out from the other antennas.

The technique of an embodiment of the invention will then consist in canceling the interference on each of the data elements to be protected in possibly implementing parallel processing of the different proximity rings, these rings being disjoined.

In general, if the multicarrier signal implements an Iota type prototype function, the steps of computing a first partial interference and of determining at least one value to be assigned to at least one data element of the first proximity ring other than a data element to be protected implement the following relationship enabling the above-mentioned seven values to be determined:

$$\alpha((-1)^{n_0}(a_{m_0+1, n_0}-a_{m_0-1, n_0})+(a_{m_0, n_0+1}-a_{m_0, n_0-1}))- \beta(-1)^{n_0}(a_{m_0+1, n_0+1}+a_{m_0+1, n_0-1}+a_{m_0-1, n_0-1})=0$$

with $a_{m_0, n_0}$ the value of the carrier situated at the time-frequency location $(m_0, n_0)$ and $\alpha$ and $\beta$ being coefficients defined by the choice of the prototype function.

This relationship is valid when the sequences transmitted have the form $[X, 0]$ and $[0, X]$ and when the pilots are adjacent on the time axis, as illustrated with reference to FIG. 1.

Should these sequences transmitted have the form $[X, Y]$ and $(+/-)[Y, -X]$, then it is necessary to take account of the value of the adjacent pilot in the first proximity ring relationship. In other words, it is necessary to take account of the value of the data elements to be protected (for example the second pilot) situated in the proximity ring associated with a first pilot.

For example, for the antenna 11 and the sequence $[X, Y]$, the following relationship is obtained enabling cancellation of the intrinsic interference at the position of the first pilot (X):

$$\alpha((-1)^{n_0}(a_{m_0+1, n_0}-a_{m_0-1, n_0})+(a_{m_0, n_0+1}-a_{m_0, n_0-1}))- \beta(-1)^{n_0}(a_{m_0+1, n_0+1}+a_{m_0+1, n_0-1}+a_{m_0-1, n_0-1}+Y)=0$$

To cancel the ISI due to the first proximity ring relative to the carrier $(m_0, n_0)$, it is necessary to verify the previous equation. It may be recalled that the term ISI refers to inter-symbol and/or inter-carrier interference. To this end, a value is imposed on a data element of this ring, and the value of the second pilot belonging to the first proximity ring, is taken into account. The first proximity ring will then carry the equivalent of six informative data elements.

The direct method could be chosen to express $a_{m_0-1, n_0-1}$ for example as a function of six other elements of the ring. However, an operation such as this may lead to major variations in energy between this carrier and the other six carriers and hence to problems of dynamic range of the multicarrier signal. As a consequence, a linear and unitary conversion is done so as to smoothen this phenomenon and thus provide for the conservation of energy. It is therefore preferable to fix one of the values of the first proximity ring at zero and use a matrix sized 7×7, the coefficient $a_{m_0, n_0+1}$ being zero or having a value fixed by construction (that of the second pilot), this approach enabling cancellation of the above relationship while at the same time ensuring homogeneous power for the coefficients.

Since the previous equation is time-dependent, this conversion will differ according to whether the pilots are placed on even-parity or odd-parity symbols. For the even-parity symbols (i.e. when the index $n_0$ characteristic of the position of the pilot considered in the space "time" is an even-parity number), an example of transformation is expressed here below:

$$\begin{pmatrix} a_{m_0-1,n_0-1} \\ a_{m_0,n_0-1} \\ a_{m_0+1,n_0-1} \\ a_{m_0-1,n_0} \\ a_{m_0+1,n_0} \\ a_{m_0-1,n_0+1} \\ a_{m_0+1,n_0+1} \end{pmatrix} = M_0 \begin{pmatrix} e_0 \\ e_1 \\ e_2 \\ e_3 \\ e_4 \\ e_5 \\ e_6 \end{pmatrix}$$

with, for example:

$$M_0 = \begin{pmatrix} -\alpha & -\beta & -\alpha & \beta & -\beta & 0 & \alpha \\ -\beta & 0 & \beta & \alpha & \alpha & -\beta & \beta \\ -\alpha & \beta & 0 & -\beta & -\beta & \alpha & \alpha \\ \beta & \alpha & -\beta & -\alpha & 0 & -\beta & \beta \\ -\beta & \alpha & -\beta & 0 & \alpha & \beta & \beta \\ \alpha & -\beta & \alpha & -\beta & \beta & \alpha & 0 \\ 0 & \beta & -\alpha & \beta & \beta & \alpha & \alpha \end{pmatrix}$$

should the value of the second pilot be zero (Y=0), and should $e_6$ be taken to be equal to zero. The values of $e_0, e_1, e_2, e_3, e_4, e_5$ are taken from the alphabet $\{-\sqrt{e}, \sqrt{e}\}$ where e designates the energy of the symbols transmitted on each of the carriers.

For the odd-parity symbols (i.e. when the index $n_0$ characteristic of the position of the pilot considered in space "time" is an odd-parity value), it is represented for example by the following conversion:

$$\begin{pmatrix} a_{m_0-1,n_0-1} \\ a_{m_0,n_0-1} \\ a_{m_0+1,n_0-1} \\ a_{m_0-1,n_0} \\ a_{m_0+1,n_0} \\ a_{m_0-1,n_0+1} \\ a_{m_0+1,n_0+1} \end{pmatrix} = M_1 \begin{pmatrix} e_0 \\ e_1 \\ e_2 \\ e_3 \\ e_4 \\ e_5 \\ e_6 \end{pmatrix}$$

with, for example, $$M_1 = \begin{pmatrix} -\alpha & -\beta & 0 & \beta & -\beta & \alpha & \alpha \\ -\beta & 0 & \beta & \alpha & \alpha & -\beta & \beta \\ -\alpha & \beta & \alpha & -\beta & -\beta & 0 & \alpha \\ \beta & \alpha & -\beta & 0 & -\alpha & -\beta & \beta \\ -\beta & \alpha & -\beta & -\alpha & 0 & \beta & \beta \\ 0 & -\beta & \alpha & -\beta & \beta & \alpha & \alpha \\ \alpha & \beta & -\alpha & \beta & \beta & \alpha & 0 \end{pmatrix}$$

should the value of the second pilot be zero (Y=0) and should $e_6$ be also taken to be equal to zero.

It can be noted especially that the examples proposed here above for the matrices $M_0$ and $M_1$ are purely illustrative. Indeed, these matrices are not unique.

According to a preferred embodiment by which energy conservation can be ensured, the matrices $M_0$ and $M_1$ are chosen to be symmetrical and orthogonal.

Once the values of the first proximity ring have been determined, these computation steps are repeated to cancel the intrinsic interference at the position of the second pilot (Y).

What remains to be done therefore is to set the value of the carriers positioned at the locations $(m_0-1, n_0+2)$, $(m_0, n_0+2)$, $(m_0+1, n_0+2)$, it being known that the other values of the second contour ring have already been fixed in the previous steps. It is therefore possible to compute the second partial interference $I_{m_0, n_0+1}$ generated on this second pilot by the second proximity ring (and the first adjacent pilot if it bears a non-zero value).

It is therefore necessary to comply with the following relationship:

$$\alpha a_{m_0, n_0+2} - \beta(-1)^{n_0+1}(a_{m_0+1, n_0+2} + a_{m_0-1, n_0+2}) + I_{m_0, n_0+1} = 0$$

Once again, the procedure as above is followed in setting one of the three remaining values to be determined at zero and applying a matrix of passage (sized 3×3) to ensure that this relationship is met while at the same time assigning the same power to the transmitted coefficients.

It can finally be noted that in setting the value of two data elements among the ten values of the contour ring 13, it is possible to cancel or at least to reduce the intrinsic interference affecting the two positions within this contour ring, i.e. the two data elements to be protected which correspond for example to pilots used to estimate the propagation channel.

1.4 Application in Systems Implementing More than Two Transmit Antennas

It can also be noted that an embodiment of the invention can be applied to transmission systems implementing more than two transmit antennas, the data elements to be protected being possibly separated by at most one carrier in time and/or in frequency. In other words, the data elements to be protected are spaced out in sets of two by at most one carrier in time and at most one carrier in frequency.

Figure 2A:
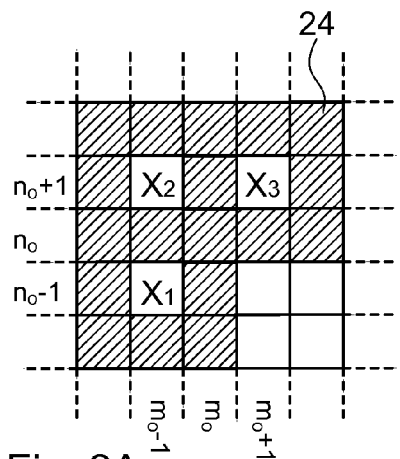
FIGS. 2A, 2B, 3 and 3B show different possible configurations of the data elements to be protected in systems implementing three or four transmit antennas and the contour ring surrounding them.
Figure 2A:
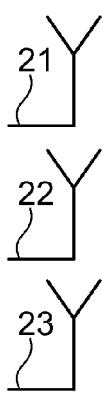
Figure 2B:
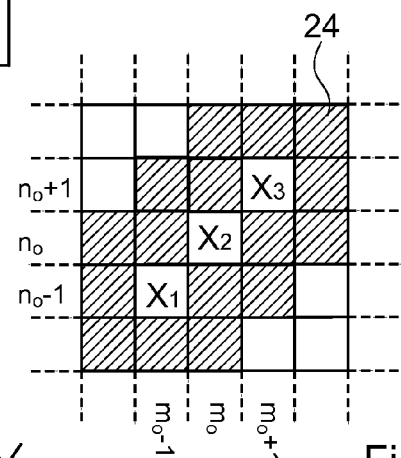
Figure 2B:
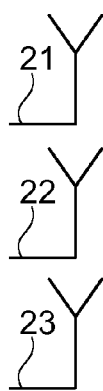

FIGS. 2A and 2B thus illustrate the transmission of an OFDM/OQAM signal from three transmit antennas 21, 22 and 23 where the pilots $X_1$, $X_2$ and $X_3$ respectively associated with each of the antennas 21, 22 and 23 are grouped together in a group of pilots that are adjacent or leave a maximum interval of one carrier between them, said group corresponding to the set of data elements to be protected, and are surrounded, for all the multicarrier signals emitted by each of the antennas, by a contour ring 24 taking account of the sending of all the pilots of the group of pilots.

Thus, as illustrated in FIG. 2A, at the time $t_0$:

the antenna 21 sends a data element to be protected with a value $X_1$ situated at the location $(m_0-1, n_0-1)$;

the antenna 22 simultaneously sends a data element to be protected with a value Y situated at the location $(m_0-1, n_0-1)$;

and the antenna 23 simultaneously sends a data element to be protected with a value Z situated at the location $(m_0-1, n_0-1)$;

At the time $t_2$:

the antenna 21 sends out a data element to be protected with the value Y situated at the location $(m_0-1, n_0+1)$ and a data element to be protected with a value Z situated at the location $(m_0+1, n_0+1)$;

the antenna 22 simultaneously sends out a data element to be protected with the value $X_2$ situated at the location $(m_0-1, n_0+1)$ and a data element to be protected with a value Y situated at the location $(m_0+1, n_0+1)$;

and the antenna 23 simultaneously sends out a data element to be protected with the value Z situated at the location $(m_0-1, n_0+1)$ and a data element to be protected with a value $X_3$ situated at the location $(m_0+1, n_0+1)$ It may be recalled especially that the conditions on the sequences sent out by each of the antennas is that they must be orthogonal and that the value of the pilots should be real for an OFDM/OQAM type multicarrier signal.

Thus, the set of data elements to be protected associated with the antenna 21 is formed by a first set comprising the pilot $X_1$ and a second set comprising the data elements Y and Z.

It can be noted that in the three-antenna configuration illustrated with reference to FIG. 2A, the pilots of the different signals sent by each of the transmit antennas 21, 22 and 23 are positioned so as to leave a maximum interval of one carrier between them along the temporal or frequency axis.

At reception, it is possible for example to assume that only the value of the pilot $X_1$ is known to a first receiver and enable the estimation of a propagation channel between the antenna 21 and the first receiver. This first receiver does not necessarily know the value of other pilots $X_2$ and $X_3$.

A second receiver can especially know the value of the pilots $X_2$ and $X_3$ and thus estimate the propagation channel between the antennas 22, 23 and this second receiver.

FIG. 2B illustrates another configuration with three transmit antennas in which the carriers of the pilots of the different signals sent are situated solely along a diagonal (i.e. with shifts of one carrier only along the temporal and frequency axis). In this configuration, the set of data elements to be protected is defined by the data elements positioned at the time-frequency locations $(m_0-1, n_0-1)$, $(m_0, n_0)$, $(m_0+1, n_0+1)$, the contour ring 24 enabling the cancellation of the inter-carrier interference being constituted by carriers that are immediately adjacent to the data elements to be protected.

Figure 3A:
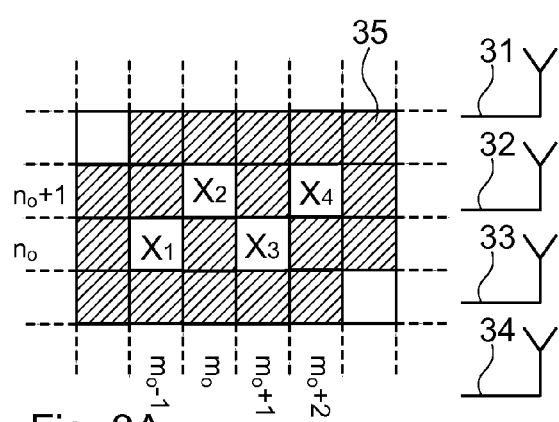
Figure 3A:
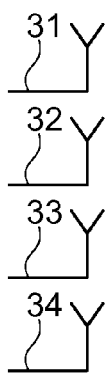
Figure 3B:
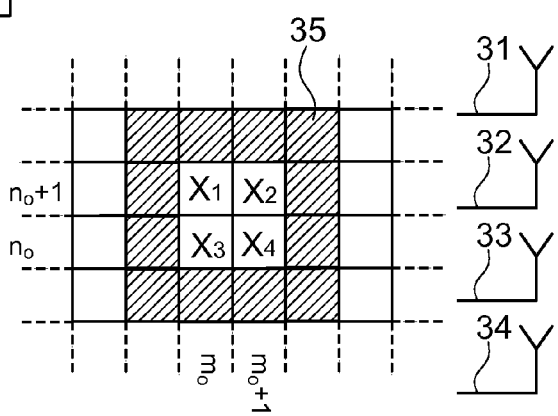
Figure 3B:
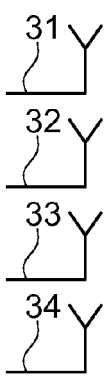

FIGS. 3A and 3B illustrate two examples of configuration in a transmission system implementing four transmit antennas 31, 32, 33 and 34, each of the pilots $X_1$, $X_2$, $X_3$ and $X_4$ being respectively associated with each of the antennas 31, 32, 33 and 34, the contour ring 35 enabling cancellation of the ISI being constituted by carriers that are immediately adjacent to the data elements to be protected.

According to the configuration of FIG. 3A, at the time $t_0$:

the antenna 31 sends out a data element to be protected having a value $X_1$ situated at the location $(m_0-1, n_0)$ and a data element to be protected with a value Z situated at the location $(m_0+1, n_0)$;

the antenna 32 sends out a data element to be protected having a value W situated at the location $(m_0-1, n_0)$ and a data element to be protected with a value Y situated at the location $(m_0+1, n_0)$;

the antenna 33 sends out a data element to be protected having a value Z situated at the location $(m_0-1, n_0)$ and a data element to be protected with a value $X_3$ situated at the location $(m_0+1, n_0)$;

the antenna 34 sends out a data element to be protected having a value Y situated at the location $(m_0-1, n_0)$ and a data element to be protected with a value W situated at the location $(m_0+1, n_0)$;

At the time $t_1$:
the antenna 31 sends out a data element to be protected having a value Y situated at the location $(m_0, n_0+1)$ and a data element to be protected with a value W situated at the location $(m_0+2, n_0+1)$;
the antenna 32 sends out a data element to be protected having a value $X_2$ situated at the location $(m_0, n_0+1)$ and a data element to be protected with a value Z situated at the location $(m_0+2, n_0+1)$;
the antenna 33 sends out a data element to be protected having a value W situated at the location $(m_0, n_0+1)$ and a data element to be protected with a value Y situated at the location $(m_0+2, n_0+1)$;
the antenna 34 sends out a data element to be protected having a value Z situated at the location $(m_0, n_0+1)$ and a data element to be protected with a value $X_4$ situated at the location $(m_0+2, n_0+1)$;

Thus, the set of data elements to be protected associated with the antenna 31 comprises a first set comprising the pilot $X_1$ and a second set comprising the data elements Y, Z, and W. For example, the data elements to be protected having values Y, Z and W are informative data elements.

More specifically, the sequences borne by each of the antennas 31, 32, 33, 34 at the time-frequency locations of the data elements to be protected must be orthogonal with one another.

According to the preferred embodiment of the invention, the data elements to be protected bearing a value Y, Z or W bear a zero value.

FIG. 3B illustrates another configuration with four transmit antennas in which the pilots of the different signals sent are situated at the time-frequency locations $(m_0, n_0)$, $(m_0, n_0+1)$, $(m_0+1, n_0+1)$, $(m_0+1, n_0)$, the contour ring 35 enabling cancellation of inter-carrier interference being constituted by carriers that are immediately adjacent to the data elements to be protected.

It will be noted especially that through these different illustrative and non-exhaustive examples, the data elements to be protected are separated by at most one carrier in time and/or carrier in frequency, i.e. that the data elements to be protected are spaced out two by two by at most one carrier in time and at most one carrier in frequency, whatever the number of transmit antennas. Indeed, it is assumed that the data elements to be protected do not interfere with each other or apply little interference to each other when they are spaced out by two carriers in time and/or frequency, the essential part of the interference affecting a data element to be protected being due to the immediately adjacent to carriers.

The transmission and interference cancellation technique of an embodiment of the invention can therefore be extended to any configuration whatsoever of pilots implementing imbricated proximity rings.

For example, the pilots of the different signals sent can be grouped together consecutively or may leave a maximum interval of one carrier between them along the time axis and consecutively along the frequency axis so as to reduce the latency time that arises during the use of a large number of pilots.

Furthermore, in order to improve the signal-to-noise ratio of the channel estimation, pilots may be grouped together at adjacent positions or may leave a maximum interval of one carrier between them along the time axis and/or frequency axis so that at least two pilots in this group are assigned to each of the transmit antennas.

Figure 4:
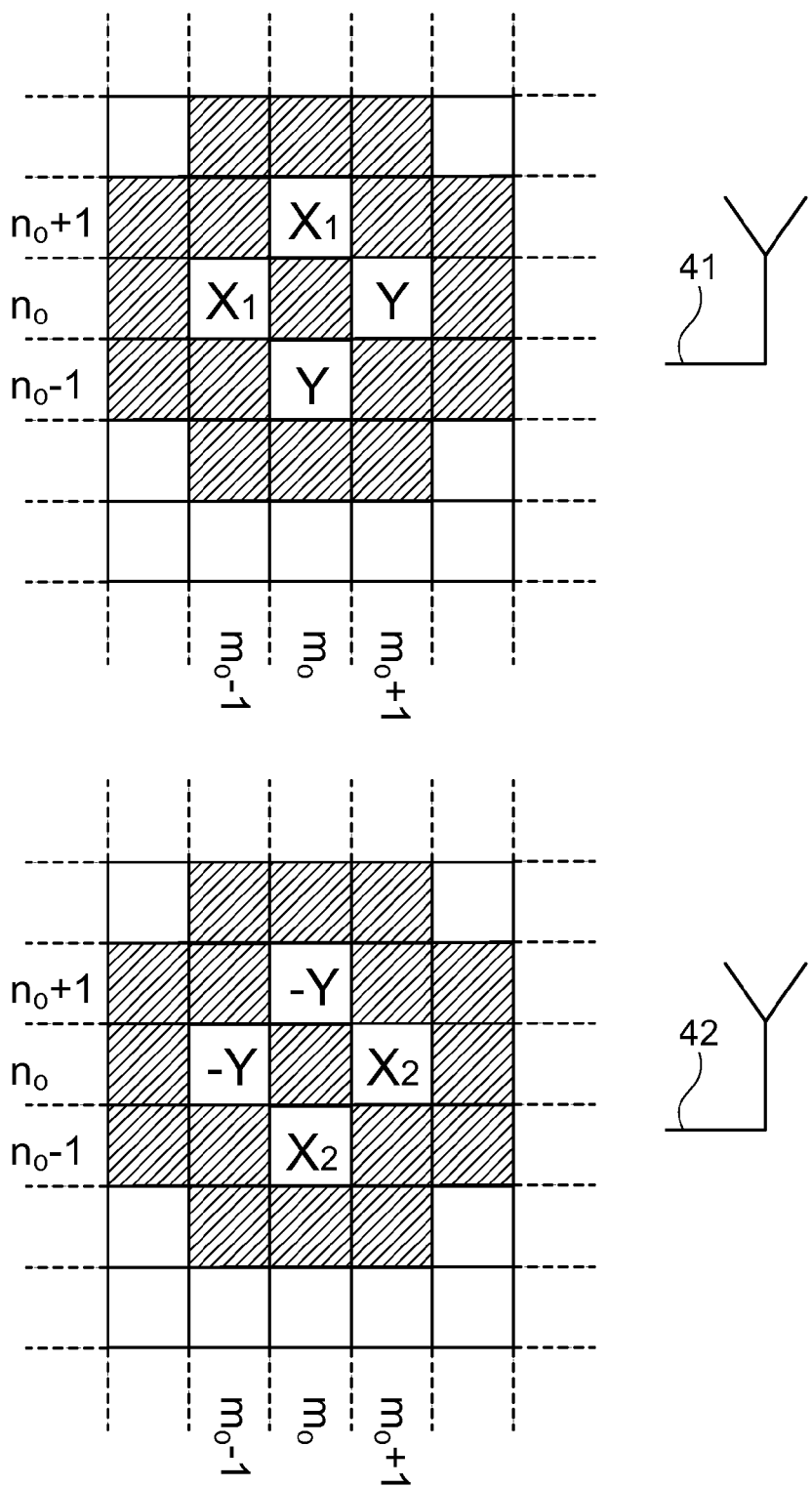
FIG. 4 illustrates an application to the transmission, in a multi-antenna system, of several pilots in a same contour ring.

This variant is illustrated especially with reference to FIG. 4.

1.5 Example of an Application in a System Implementing Two Transmit Antennas, and Several Pilots in the Contour Ring Referring now to FIG. 4, we present an alternative embodiment of the invention in which an increased number of pilots is transmitted, these pilots being associated with each of the antennas, and especially several pilots associated with a same antenna in a same contour ring.

We consider for example the transmission of two pilots $X_1$ spaced out by at most one carrier in time and/or frequency on the first transmit antenna 41 and two pilots $X_2$ spaced out by at most one carrier in time and/or frequency on the second transmit antenna 42. We also consider, for each transmit antenna, the transmission of carriers bearing the values zero (Y=0) at the two positions corresponding in the time/frequency space to the positions of the pilots of the other antenna.

In other words, considering the configuration of FIG. 4:
at the instant $t_0$, the antenna 41 sends out a data element to be protected having a zero value situated at the position $(m_0, n_0-1)$ and the antenna 42 send out a pilot $X_2$ at the corresponding position $(m_0, n_0-1)$;
at the instant $t_1$, the antenna 41 sends out a pilot $X_1$ at the position $(m_0-1, n_0)$ and a data element to be protected having a value of zero at the position $(m_0+1, n_0)$ and the antenna 42 sends out a data element to be protected having a value zero at the position $(m_0-1, n_0)$ and a pilot $X_2$ at the position $(m_0+1, n_0)$;
and at the instant $t_2$, the antenna 41 sends out a pilot $X_1$ at the position $(m_0, n_0+1)$ and the antenna 42 sends a data element to be protected having a value zero at the position $(m_0, n_0+1)$.

An embodiment of the invention can also be used to improve the signal-to-noise ratio by increasing the number of pilots sent out by an antenna, distributed in the multicarrier signal, without in any way thereby wasting the time-frequency resource, i.e. without losing compactness in the contour ring.

It is clear that the value Y can be different from 0.

Furthermore, this technique can be applied to the case of a transmission system implementing only one transmit antenna sending out a multicarrier signal comprising an increased number of pilots, and especially several pilots spaced out by at most one carrier in time and/or in frequency.

1.6 Estimation of the Channel

On the basis of values received by each pilot, it is possible to retrieve the coefficients $H_n$ representing an efficient estimation of the channel, since the intrinsic interference in these pilots is reduced.

We may consider for example a transmission system implementing two transmit antennas, the pilots associated with each of the antennas being situated on two adjacent frequencies at the same symbol time (for example at positions $(m_0, n_0)$ and $(m_0+1, n_0)$). It is assumed that the operation for canceling the ISI as described here above has been performed and [X, Y] and [Y, −X] then are used to denote the sequences transmitted respectively on the first and second antenna.

In this case, the two pilots will interfere with each other during transmission.

In particular, $H_1$ is considered to be the value of the propagation channel coefficient between the first transmit antenna and the receive antenna, and $H_2$ the value of the propagation channel coefficient between the second transmit antenna and the receive antenna. It may be recalled that the propagation channel between a given transmit antenna and a reception antenna is considered to be invariant in the contour ring.

We then have at reception, depending on the values of the ambiguity function of the OFDM/OQAM filter chosen:

$$R_1 = X.H_1 + Y.H_2 + j\alpha(-X).H_2 + j\alpha(Y).H_1 = H_1(X+j\alpha Y) + H_2(Y-j\alpha X)$$

$$R_2 = Y.H_1 - X.H_2 - j\alpha(Y).H_2 - j\alpha(X).H_1 = H_1(Y-j\alpha X) - H_2(X+j\alpha Y)$$

if the time index of the OFDM/OQAM symbol is an even-parity value (i.e. if $n_0$ is an even value);

or:

$$R_1 = H_1(X+j\alpha Y) - H_2(Y-j\alpha X)$$

$$R_2 = H_1(Y-j\alpha X) + H_2(X+j\alpha Y)$$

if the temporal index of the OFDM/OQAM symbol is an odd-parity value (i.e. if $n_0$ is an odd value).

To simplify the computation in this example, it may be deemed without loss of generality that the values of the pilots are Y=0 and X=1.

In this case:

$$R_1 = H_1(X+j\alpha Y) + H_2(Y-j\alpha X) = H_1 - j\alpha H_2$$

$$R_2 = H_1(Y-j\alpha X) - H_2(X+j\alpha Y) = -(H_2 + j\alpha H_1)$$

i.e. in assuming $R'_2 = -R_2$:

$$R_1 + j\alpha R'_2 = H_1 - j\alpha H_2 + j\alpha H_2 - \alpha^2 H_1 = (1-\alpha^2)H_1$$

$$R_1 - j\alpha R'_2 = H_2 + j\alpha H_1 - j\alpha H_1 - \alpha^2 H_2 = (1-\alpha^2)H_2$$

thus enabling the channel coefficients $H_1$ and $H_2$ to be retrieved.

It can be noted especially that, whatever the number N of transmit antennas and the distribution of the pilots in the contour ring, the coefficients of the equations to retrieve the values of the pilots will depend on the values of the ambiguity function at the points $(m.m_0, n.n_0)$ with m and n corresponding respectively to the frequency and time shifts between the data elements to be protected within the ring, this ambiguity function being that of the OFDM/OQAM function used for the modulator (for example the IOTA) function.

Furthermore, to simplify the computations should the number of antennas be great (N>4), we may consider the values of the ambiguity function at the points $(m.m_0, n.n_0)$ with m and n included in $[-1, 0, 1]$ and assume them to be zero elsewhere. It can also be noted that for all the functions used in OFDM/OQAM, the ambiguity function gets canceled out by construction at the points $(2m.m_0, 2n.n_0)$.

For example, if we again consider the example illustrated in FIG. 4, in which two pilots $X_1$ are transmitted on the first transmit antenna 41 and two pilots $X_2$ are transmitted on the second transmit antenna 42, and for each transmit antenna, carriers having the zero value (Y=0) are transmitted to the two positions in the time-frequency space corresponding to the positions of the pilots of the other antenna, the following are obtained in reception:

$$R_1 = H_1(1+j\alpha) + j\alpha H_2$$

$$R_2 = H_1(1-j\alpha) - j\alpha H_2$$

$$R_3 = H_2(1+j\alpha) + j\alpha H_1$$

$$R_4 = H_2(1-j\alpha) - j\alpha H_1$$

in considering $R_1$ to be the value received at the position $(m_0-1, n_0)$, $R_2$ the value received at the position $(m_0, n_0+1)$, $R_3$ the value received at the position $(m_0+1, n_0)$ and $R_4$ the value received at the position $(m_0, n_0-1)$.

We therefore obtain:

$$X_1 = R_1(1-j\alpha) + R_2(1+j\alpha) = 2(1+\alpha^2)H_1 + 2\alpha^2 H_2$$

$$X_2 = R_3(1-j\alpha) + R_4(1+j\alpha) = 2(1+\alpha^2)H_2 + 2\alpha^2 H_1$$

and:

$$2\alpha^2 X_2 - 2(1+\alpha^2)X_1 = 4(1+2\alpha^2)H_1$$

$$2\alpha^2 X_1 - 2(1+\alpha^2)X_2 = 4(1+2\alpha^2)H_2$$

If the noises received at the different positions $R_i$ are equal to $b_i$, for $1 \leq i \leq 4$, we get the following values for the first equation:

$$2\alpha^2 X_2 - 2(1+\alpha^2)X_1 = 4(1+2\alpha^2)H_1 - 2(1+\alpha^2)((1-j\alpha)b_1 + (1+j\alpha)b_2) + 2\alpha^2((1-j\alpha)b_3 + (1+j\alpha)b_4)$$

The signal-to-noise ratio is therefore improved because we have:

$$4(1+2\alpha^2) > 2.\sqrt{(1+\alpha^2) \cdot (2+8\alpha^2+16\alpha^4)}$$

The second term corresponds to the resultant noise power for a pilot power emitted by an antenna standardized at 1. This is why, as we have two pilots per antenna, this power has been multiplied by 2.

Figure 5:
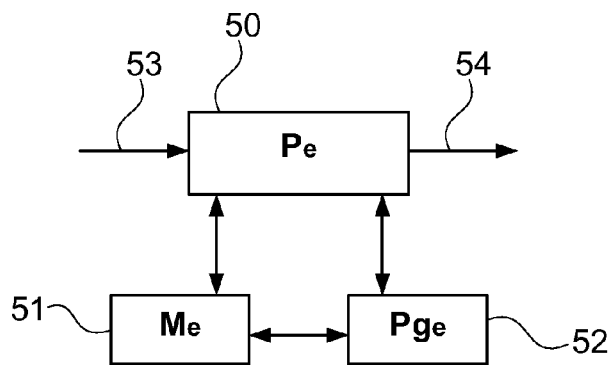
FIG. 5 shows the structure of a system for the transmission of a multicarrier signal according to an embodiment of the invention.

Referring now to FIG. 5, we present the hardware structure of a system of transmission of a multiple carrier signal implementing the method described here above.

A transmission system of this kind comprises a memory $M_e$ 51, a processing unit $P_e$ 50, equipped for example with a microprocessor $\mu P_e$, and driven by a computer program $Pg_e$ 52.

At initialization, the code instructions of the computer 52 are for example loaded into a RAM before being executed by the processor of the processing unit 50. At input the processing unit 50 receives symbols 53 comprising a set of data elements comprising pilots and informative data elements.

The microprocessor $\mu P_e$ of the processing unit 50 implements the steps of the transmission method described here above according to the instructions of the program $Pg_e$ 52. The processing unit 50 outputs a multicarrier signal 54 comprising a set of at least two data elements to be protected separated by at most one carrier in time and/or in frequency, at least one value being assigned to at least one data element of a contour ring constituted by carriers that are immediately adjacent to data elements to be protected, for the reduction at reception of interference affecting the data elements to be protected.

Figure 6:
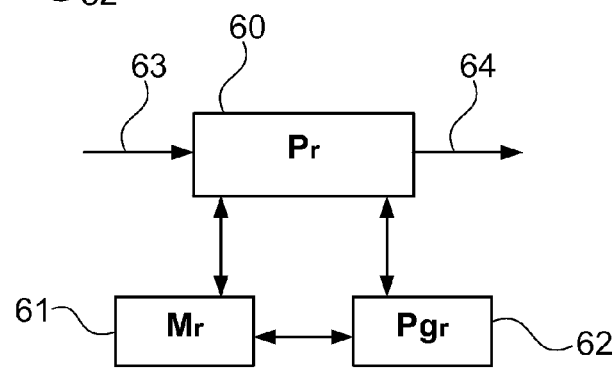
FIG. 6 shows the structure of a system for reception of a multicarrier signal according to an embodiment of the invention.
Figure 7:
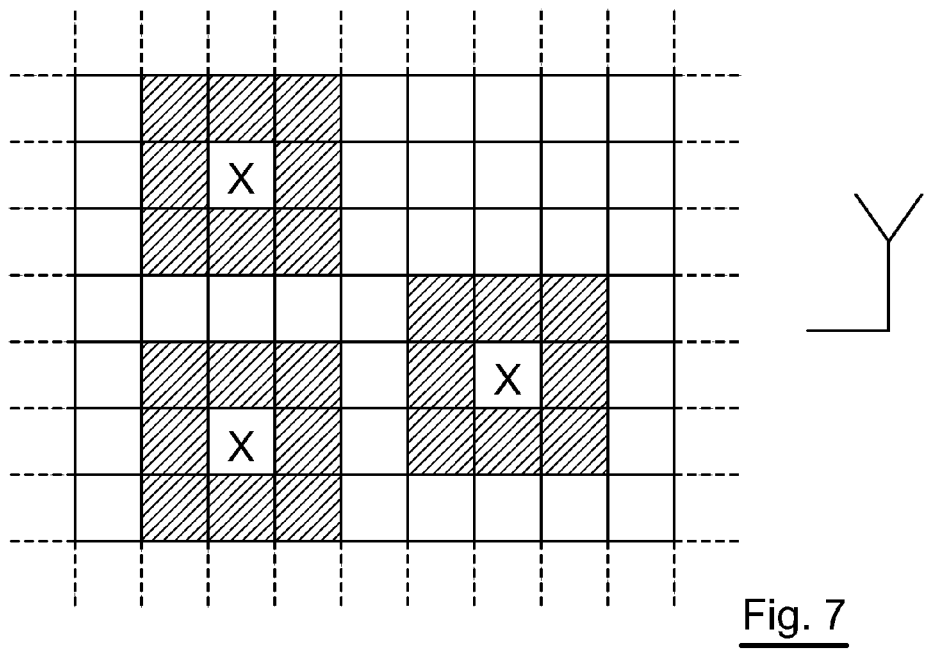
FIG. 7 illustrates the application of the technique of the prior art to systems implementing several pilots.

Finally, a description is made, referring to FIG. 6, of the hardware structure of a system for the reception of a multicarrier signal implementing the channel estimation technique described here above.

A reception system of this kind comprises a memory $M_r$ 61, a processing unit $P_r$ 60, equipped for example with a microprocessor $\mu P_r$, and driven by a computer program $Pg_r$ 62.

At initialization, the code instructions of the computer 62 are for example loaded into a RAM and then executed by the processor of the processing unit 60. The processing unit 60 inputs the multicarrier signal 64 comprising a set of at least two data elements to be protected separated at most by one carrier in time and/or in frequency, at least one value being assigned to at least one data element of a contour ring consisting of carriers that are immediately adjacent to data elements to be protected, for the reduction at reception of interference affecting the data elements to be protected.

The microprocessor μP$_r$ of the processor unit 60 implements the steps of the reception method described here above, namely a step for estimating the transfer function of a transmission channel on the basis of at least some of the data elements to be protected and a step for retrieving data elements of the contour ring according to the instructions of the program Pg$_r$ 62.

The processing unit 60 outputs an estimation 64 of the informative data elements of the multicarrier signal.

2. Intrinsic Interference: Without Propagation Channel 2.1 Classic OFDM

In the context of transmission implementing a classic OFDM modulation with guard interval, symbols with complex values $c_{m,n}$ are sent out (m being the index of the sub-carrier and n being the time index).

The signal sent out can be written in the following form:

$$s(t) = \sum_{n} \sum_{m=0}^{M-1} c_{m,n} g_{m,n}(t)$$

with $g_{m,n}(t)$ which are the time-shifted and frequency-shifted versions of the prototype function g(t).

In the context of a classic OFDM type modulation, we have $g(t)=1_{[0,\, Ts+\Delta[}$ and consequently:

$$g_{m,n}(t)=1_{[n(Ts+\Delta),\, (n+1)(Ts+\Delta)[}e^{-2j\pi m v_0 t}$$

In classic OFDM, we have a complex orthogonality between the carriers, signifying that:

$$\int \Re_{g_{m,n}(t)g^*_{m_0,n_0}(t)}dt = \delta_{m,m_0}\delta_{n,n_0}$$

At reception, the following are truly obtained (using a fast Fourier transform or FFT algorithm) should there be no propagation channel:

$$\int \Re_{s(t)g^*_{m_0,n_0}(t)}dt = c_{m_0,n_0}$$

2.2 OFDM/OQAM

Hereinafter, the context is that of transmission implementing an OFDM/OQAM modulation, and especially the IOTA prototype function.

Data elements having real values $a_{m,n}$ are transmitted at a rhythm $t_0$ that is twice as high as in the case of classic OFDM. The spectral efficiency of the number of equivalent complex symbols is therefore the same as a classic OFDM without guard interval.

In other words, for a same inter-carrier space $v_0$, one real value is transmitted by sub-carrier every $\tau_0$ in OFDM/OQAM, and one complex value (i.e. the equivalent of two real values) every $2\tau_0$ in classic OFDM without guard interval. The quantity of information transmitted is therefore identical.

Consequently, the spectral efficiency of OFDM/OQAM is $(Tg+2\tau_0)/2\tau_0$ times greater than that of the OFDM with a guard interval having a duration Tg.

Resuming the same representation of the signal as here above, the OFDM/OQAM signal transmitted can be written as follows:

$$s(t) = \underbrace{\sum_{n} \sum_{m=0}^{M-1} a_{m,n} i^{m+n} e^{2i\pi m v_0 t} g(t - n\tau_0)}_{g_{m,n}(t)}$$

where $a_{m,n}$ are the real symbols (Offset QAM) sent on the $m^{th}$ sub-carrier at the $n^{th}$ symbol time, M is the number of sub-carriers, $v_0$ is the inter-carrier spacing, $\tau_0$ represents the duration of an OFDM/OQAM symbol, and g is the prototype function. The function g(t) can especially be the IOTA prototype function or any other function that can guarantee the conditions of the real orthogonality and perfect reconstruction.

It might be recalled that the prototype function modulating each sub-carrier must be located precisely in the time domain in order to limit inter-symbol interference and located precisely in the frequency domain to limit inter-carrier interference (due to the Doppler effect, phase noise, etc.). This function must also guarantee orthogonality between the sub-carriers.

The orthogonality between the time-shifted and frequency-shifted functions of the prototype function is guaranteed if:

$$\Re e\left(\int_{\mathcal{R}} g_{m,n}(t) \cdot g^*_{m_0,n_0}(t) dt\right) = \delta_{m,m_0}\delta_{n,n_0}$$

At reception of the signal, should there be no propagation channel, we have:

$$\Re e(\int \Re_{s(t)g^*_{m_0,n_0}(t)}dt) = a_{m_0,n_0}$$

but:

$$\int_{\mathcal{R}} s(t)g^*_{m_0,n_0}(t)dt = a_{m_0,n_0} + \sum_{(m,n)\neq(m_0,n_0)} a_{m,n} \int_{\mathcal{R}} g_{m,n}(t)g_{m_0,n_0}(t)/dt$$

$$\int_{\mathcal{R}} s(t)g^*_{m_0,n_0}(t)dt = a_{m_0,n_0} + I_{m_0,n_0}$$

The term $I_{m_0,n_0}$ represents the intrinsic interference and this interference depends on the other data $a_{m,n}$ sent. It can be shown that $I_{m_0,n_0}$ depends chiefly on the eight carriers neighboring $g_{m_0,n_0}$.

If $C_{m_0,n_0}^1$ refers to the interference due to the eight carriers, we can write:

$$C_{m_0,n_0}^1 = \sum_{(m,n)\in \Omega^1_{m_0,n_0}} a_{m,n} \int_{\mathcal{R}} g_{m,n}(t)g^*_{m_0,n_0}(t)dt$$

with $\Omega_{m_0,n_0}^1$ which represents the set of indices of the neighboring carriers.

For the estimation of the channel in OFDM/IOTA, a relationship is introduced, in the patent document FR 2 814 302, between the eight carriers surrounding the pilot to eliminate this intrinsic interference locally (and almost totally).

The relationship to be complied with is the following:

$$\alpha((-1)^{n_0}(a_{m_0+1,\, n_0}a_{m_0-1}) + (a_{m_0,\, n_0-1} - a_{m_0,\, n_0-1})) - \beta(-1)^{n_0}$$
$$(a_{m_0+1,\, n_0+1} + a_{m_0-1,\, n_0+1} + a_{m_0+1,\, n_0-1} +$$
$$a_{m_0-1,\, n_0-1}) = 0$$

In the specific case of the IOTA prototype function, we have α=−0.4411 and β=−0.2280.

It can be noted that especially that for any carrier whatsoever $g_{m_0, n_0}$ in IOTA, we have the following as received symbols before the real part is taken:

$$a_{m_0,n_0} + j\left(\begin{array}{l}\alpha((-1)^{n_0}(a_{m_0+1,n_0} - a_{m_0-1,n_0}) + (a_{m_0,n_0+1} - a_{m_0,n_0-1})) \\ -\beta(-1)^{n_0}(a_{m_0+1,n_0} + a_{m_0-1,n_0} + a_{m_0+1,n_0-1} + a_{m_0-1,n_0-1})\end{array}\right)$$

3. Reminders Concerning the Ambiguity Function 3.1 Definition

Let x(t) be an even-parity function and X(f) its Fourier transform. Then:

$$A_x(\tau, \nu) = \int_{-\infty}^{+\infty} x\left(t + \frac{\tau}{2}\right) \cdot x^*\left(t - \frac{\tau}{2}\right) \cdot e^{-2i\pi\nu t} dt$$

is written as the ambiguity function of x.

Furthermore, we have:

$$A_x(\tau, \nu) = \int_{-\infty}^{+\infty} X\left(f + \frac{\nu}{2}\right) \cdot X^*\left(f - \frac{\nu}{2}\right) \cdot e^{-2i\pi\tau f} df$$

Property: x(t) even $\rightarrow A_x(t, n)$ real.

3.2 Case of an OFDM/OQAM Network

In the case of an OFDM/OQAM network of density 2, the functions $x_{m,n}(t)$ have the following form:

$$x_{m,n}(t) = i^{m+n} e^{2i\pi m\nu_0 t} x(t - n\tau_0)$$

and in this case:

$$\langle x_{m,n} | x_{m',n'} \rangle = \int_{-\infty}^{+\infty} i^{(m-m')+(n-n')} e^{2i\pi(m-m')\nu_0 t} x(t - n\tau_0) x^*(t - n'\tau_0) dt$$

As in OFDM/OQAM, the function x(t) is even, the function $A_x(t, n)$ is real. The scalar product between $x_{m,n}(t)$ and $x_{m',n'}(t)$ will therefore be real if and only if (m−m') and (n−n') are even values. If not it is purely imaginary.

To meet the condition of real orthogonality in OFDM/OQAM, we therefore need a function x(t) that complies with any couple (m, n)≠(0, 0):

$$A_x(2n\tau_0, 2m\nu_0) = 0$$

The value of the interference can be computed for certain particular points.

3.3 Computation of the Interference

On two time-shifted symbols, we have:

$$\langle x_{m_0,n_0} | x_{m_0,n_0+1} \rangle = \int_{-\infty}^{+\infty} i^{(n_0 - n_0 - 1)} x(t - n_0\tau_0) x^*(t - (n_0+1)\tau_0) dt$$

$$\langle x_{m_0,n_0} | x_{m_0,n_0+1} \rangle = -i \int_{-\infty}^{+\infty} x(t - n_0\tau_0) x^*(t - (n_0+1)\tau_0) dt$$

$$\langle x_{m_0,n_0} | x_{m_0,n_0+1} \rangle = -i \int_{-\infty}^{+\infty} x(t + \tau_0/2) x(t - \tau_0/2) dt$$

and:

$$\langle x_{m_0,n_0+1} | x_{m_0,n_0} \rangle = \int_{-\infty}^{+\infty} i^{(n_0+1-n_0)} x(t - (n_0+1)\tau_0) x^*(t - n_0 + 1\tau_0) dt$$

$$\langle x_{m_0,n_0+1} | x_{m_0,n_0} \rangle = i \int_{-\infty}^{+\infty} x(t - (n_0+1)\tau_0) x^*(t - n_0\tau_0) dt$$

$$\langle x_{m_0,n_0+1} | x_{m_0,n_0} \rangle = i \int_{-\infty}^{+\infty} x(t + \tau_0/2) x(t - \tau_0/2) dt = -\langle x_{m_0,n_0} | x_{m_0,n_0+1} \rangle$$

in using the fact that x(t) is real.

On two frequency-shifted symbols, we have:

$$\langle x_{m_0,n_0} | x_{m_0+1,n_0} \rangle =$$
$$\int_{-\infty}^{+\infty} i^{(m_0 - m_0 - 1)} e^{2i\pi(m_0 - m_0 - 1)\nu_0 t} x(t - n_0\tau_0) x^*(t - n_0\tau_0) dt$$

$$\langle x_{m_0,n_0} | x_{m_0+1,n_0} \rangle = -i \int_{-\infty}^{+\infty} e^{-2i\pi\nu_0 t} x(t - n_0\tau_0) x^*(t - n_0\tau_0) dt$$

With the change of variable $t' = t - n_0 t_0$ we obtain:

$$\langle x_{m_0,n_0} | x_{m_0+1,n_0} \rangle = -i \int_{-\infty}^{+\infty} e^{-2i\pi\nu_0(t + n_0\tau_0)} x(t) x^*(t) dt$$

$$\langle x_{m_0,n_0} | x_{m_0+1,n_0} \rangle = -i e^{-2i\pi\nu_0 n_0 \tau_0} \int_{-\infty}^{+\infty} e^{-2i\pi\nu_0 t} x(t) x^*(t) dt$$

$$\langle x_{m_0,n_0} | x_{m_0+1,n_0} \rangle = -i e^{-i\pi n_0} \int_{-\infty}^{+\infty} e^{-2i\pi\nu_0 t} x(t) x^*(t) dt$$

for $t_0 n_0 = \frac{1}{2}$.

We therefore have:

$$\langle x_{m_0,n_0} | x_{m_0+1,n_0} \rangle = -i(-1)^{n_0} \int_{-\infty}^{+\infty} e^{-2i\pi\nu_0 t} x(t) x^*(t) dt$$

In using the same equations, we obtain:

$$\langle x_{m_0+1,n_0} | x_{m_0,n_0} \rangle =$$
$$\int_{-\infty}^{+\infty} i^{(m_0+1-m_0)} e^{2i\pi(m_0+1-m_0)\nu_0 t} x(t - n_0\tau_0) x^*(t - n_0\tau_0) dt$$

$$\langle x_{m_0+1,n_0} | x_{m_0,n_0} \rangle = i \int_{-\infty}^{+\infty} e^{+2i\pi\nu_0 t} x(t - n_0\tau_0) x^*(t - n_0\tau_0) dt$$

i.e. with the change in variable $t' = t - n_0 t_0$, and considering $t_0 n_0 = \frac{1}{2}$:

$$\langle x_{m_0+1,n_0} | x_{m_0,n_0} \rangle = i \int_{-\infty}^{+\infty} e^{2i\pi\nu_0(t + n_0\tau_0)} x(t) x^*(t) dt$$

$$\langle x_{m_0+1,n_0} | x_{m_0,n_0} \rangle = i e^{2i\pi\nu_0 n_0 \tau_0} \int_{-\infty}^{+\infty} e^{2i\pi\nu_0 t} x(t) x^*(t) dt$$

$$\langle x_{m_0+1,n_0} | x_{m_0,n_0} \rangle = i e^{i\pi n_0} \int_{-\infty}^{+\infty} e^{2i\pi\nu_0 t} x(t) x^*(t) dt$$

We therefore have:

$$\langle x_{m_0+1,n_0} | x_{m_0,n_0} \rangle = i(-1)^{n_0} \int_{-\infty}^{+\infty} e^{2i\pi v_0 t} x(t) x^*(t) dt$$

With the change in variable t'=−t we obtain:

$$\langle x_{m_0+1,n_0} | x_{m_0,n_0} \rangle = i(-1)^{n_0} \int_{-\infty}^{+\infty} e^{-2i\pi v_0 t'} x(-t') x^*(-t') dt$$

and since x(t) is an even value:

$$\langle x_{m_0+1,n_0} | x_{m_0,n_0} \rangle = i(-1)^{n_0} \int_{-\infty}^{+\infty} e^{-2i\pi v_0 t} x(t) x^*(t) dt$$
$$= -\langle x_{m_0,n_0} | x_{m_0+1,n_0} \rangle$$

Finally, using the same equations, we obtain:

$$\langle x_{m_0,n_0} | x_{m_0+1,n_0+1} \rangle =$$
$$\int_{-\infty}^{+\infty} i^{(m_0-m_0-1)+(n_0-n_0-1)} e^{2i\pi(m_0-m_0-1)v_0 t} x(t-n_0\tau_0) x^*(t-(n_0+1)\tau_0) dt$$
$$\langle x_{m_0,n_0} | x_{m_0+1,n_0+1} \rangle = \int_{-\infty}^{+\infty} e^{-2i\pi v_0 t} x(t-n_0\tau_0) x^*(t-(n_0+1)\tau_0) dt$$

In again using the same change in variable t'=t−$n_0 t_0$, and considering $t_0 n_0 = 1/2$ we obtain:

$$\langle x_{m_0,n_0} | x_{m_0+1,n_0+1} \rangle = -e^{-2i\pi v_0 n_0 \tau_0} \int_{-\infty}^{+\infty} e^{-2i\pi v_0 t} x(t) x^*(t-\tau_0) dt$$
$$\langle x_{m_0,n_0} | x_{m_0+1,n_0+1} \rangle = -(-1)^{n_0} \int_{-\infty}^{+\infty} e^{-2i\pi v_0 t} x(t) x^*(t-\tau_0) dt$$
$$\langle x_{m_0,n_0} | x_{m_0+1,n_0+1} \rangle = -(-1)^{n_0} \int_{-\infty}^{+\infty} e^{-2i\pi v_0 t} x(t) x(t-\tau_0) dt$$
$$\langle x_{m_0,n_0} | x_{m_0+1,n_0+1} \rangle = -(-1)^{n_0} \int_{-\infty}^{+\infty} e^{-2i\pi v_0 t} x(t) x(t-\tau_0) dt$$

Similarly, we have:

$$\langle x_{m_0+1,n_0+1} | x_{m_0,n_0} \rangle =$$
$$\int_{-\infty}^{+\infty} i^{(m_0+1-m_0)+(n_0+1-n_0)} e^{2i\pi(m_0+1-m_0)v_0 t} x(t-(n_0+1)\tau_0) x^*(t-n_0\tau_0) dt$$
$$\langle x_{m_0+1,n_0+1} | x_{m_0,n_0} \rangle = -\int_{-\infty}^{+\infty} e^{2i\pi v_0 t} x(t-n_0\tau_0) x^*(t-(n_0+1)\tau_0) dt$$

With the change in variable t'=t−$n_0 t_0$ we obtain:

$$\langle x_{m_0+1,n_0+1} | x_{m_0,n_0} \rangle = -e^{2i\pi v_0 n_0 \tau_0} \int_{-\infty}^{+\infty} e^{2i\pi v_0 t} x(t-\tau_0) x^*(t) dt$$
$$\langle x_{m_0+1,n_0+1} | x_{m_0,n_0} \rangle = -(-1)^{n_0} \int_{-\infty}^{+\infty} e^{2i\pi v_0 t} x(t-\tau_0) x(t) dt$$

With the change in variable t'=−t, we obtain:

$$\langle x_{m_0+1,n_0+1} | x_{m_0,n_0} \rangle = -(-1)^{n_0} \int_{-\infty}^{+\infty} e^{-2i\pi v_0 t} x(-t-\tau_0) x(-t) dt$$

and since x(t) is an even value:

$$\langle x_{m_0+1,n_0+1} | x_{m_0,n_0} \rangle = -(-1)^{n_0} \int_{-\infty}^{+\infty} e^{-2i\pi v_0 t} x(t+\tau_0) x(t) dt$$

With the change in variable t'=t+$t_0$ we obtain:

$$\langle x_{m_0+1,n_0+1} | x_{m_0,n_0} \rangle = -(-1)^{n_0} \int_{-\infty}^{+\infty} e^{2i\pi v_0 \tau_0} e^{-2i\pi v_0 t} x(t) x(t-\tau_0) dt$$

and since $t_0 n_0 = 1/2$:

$$\langle x_{m_0+1,n_0+1} | x_{m_0,n_0} \rangle = (-1)^{n_0} \int_{-\infty}^{+\infty} e^{-2i\pi v_0 t} x(t) x(t-\tau_0) dt$$
$$= -\langle x_{m_0+1,n_0+1} | x_{m_0+1,n_0+1} \rangle$$

4. Conclusion

An aspect of the disclosure provides a technique for the transmission of a multicarrier signal enabling a reduction in the intrinsic inter-symbol interference and/or inter-carrier interference.

In particular, an aspect of the disclosure proposes a technique of this kind that is suited to the transmission of a large number of pilots in a multicarrier signal, for example in MISO or MIMO type multi-antenna systems.

An aspect of the disclosure provides a technique of this kind that is suited to the transmission of OFDM/OQAM type signals.

Yet another aspect of the disclosure propose a technique of transmission that is simple and costs little to implement and has improved performance as compared with the prior art techniques in enabling especially a more precise channel estimation than in the prior art techniques.

Although the present disclosure has been described with reference to one or more examples, workers skilled in the art will recognize that changes may be made in form and detail without departing from the scope of the disclosure and/or the appended claims.

The invention claimed is:

1. Method for transmission of a multicarrier signal formed by a temporal succession of symbols comprising a set of data elements, each of said data elements modulating a carrier frequency of said signal, said data elements comprising firstly reference data elements called pilots, a value at transmission of at least certain of said pilots being known to at least one receiver designed to carry out a reception of this signal and secondly informative data elements, a value at transmission of said informative data elements being not known a priori to said receiver or receivers, one of said carrier frequencies modulated at a given instant by one of said data elements being called a carrier, wherein the method comprises:
  a step of computation of an interference affecting a set of at least two data elements to be protected, said data elements to be protected being spaced out two by two from at most one carrier in time and at most one carrier in frequency, said interference taking account of the value of said data elements to be protected and of the values of the data elements of a contour ring constituted by said carriers that are immediately adjacent to said data elements to be protected; and a step of determining at least one value to be assigned to at least one data element of said contour ring, to reduce said computed interference at reception.

2. Method of transmission of a multicarrier signal according to claim 1 wherein each of said data elements to be protected is surrounded by a proximity ring comprising carriers that are immediately adjacent to said data element to be protected, and said steps of computation and determining are implemented in the form of at least one iteration of the following sub-steps:

computation of a partial interference affecting one of said data elements to be protected, the partial interference taking account of the value of said data element to be protected and of the values of the data elements of said proximity ring surrounding said data element to be protected; and determining at least one value to be assigned to at least one data element of the proximity ring that does not belong to said set of data elements to be protected, to reduce said computed partial interference at reception, a following iteration taking account of the values assigned during a current iteration, and so as to determine the values to be assigned to at least one data element of the contour ring.

3. Method of transmission of a multicarrier signal according to claim 1, wherein said multicarrier signal is sent by a first source and called a first signal, and wherein said data elements to be protected comprise:

a first set of at least one pilot of said first signal;

a second set of at least one data element to be protected that is positioned in the time-frequency space at least one location corresponding to the location of at least one pilot of at least one second multicarrier signal sent out by at least one second source and having the same structure as said first signal.

4. Method of transmission of a multicarrier signal according to claim 3, wherein the data elements to be protected of said second set are informative data elements, said data elements to be protected of said first and second sets forming a sequence orthogonal to each sequence of said least one second signal positioned at the corresponding locations in a time-frequency space.

5. Method of transmission according to claim 1, wherein said multicarrier signal is of an OFDM/OQAM type.

6. A method comprising:

producing a multicarrier signal formed by a temporal succession of symbols comprising a set of data elements, each of said data elements modulating a carrier frequency of said signal, said data elements comprising firstly reference data elements called pilots, a value at transmission of at least certain of said pilots being known to at least one receiver designed to carry out a reception of said signal and secondly informative data elements, a value at transmission of said informative data elements being not known a priori to said receiver or receivers, one of said carrier frequencies modulated at a given instant by one of said data elements being called a carrier, wherein said signal comprises a set of at least two data elements to be protected, said data elements to be protected being spaced out two by two from at most one carrier in time and at most one carrier in frequency, at least one value being assigned to at least one data element of a contour ring constituted by said carriers that are immediately adjacent to said data elements to be protected to reduce an interference affecting said data elements to be protected, at reception, said interference taking account of the value of said data elements to be protected and of the values of the data elements of said contour ring, and transmitting the signal.

7. Method comprising receiving a multicarrier signal formed by a temporal succession of symbols comprising a set of data elements, each of said data elements modulating a carrier frequency of said signal, said data elements comprising firstly reference data elements called pilots, a value at transmission of at least certain of said pilots being known to at least one receiver designed to carry out a reception of said signal and secondly informative data elements, a value at transmission of said informative data elements being not known a priori to said receiver or receivers, one of said carrier frequencies modulated at a given instant by one of said data elements being called a carrier, wherein said received signal comprising at least two data elements to be protected, said data elements being spaced out two by two from at most one carrier in time and at most one carrier in frequency, a processing operation being done before transmission on the signal so as to assign at least one value to at least one data element of a contour ring constituted by said carriers that are immediately adjacent to the data elements to be protected to reduce an interference affecting said data elements to be protected, said method further comprising:

a step of estimation of a transfer function of a transmission channel, from at least certain of said data elements to be protected; and a step of retrieval of said data elements of said contour ring implementing a processing that is the reverse of said processing done before transmission.

8. Device for transmission of a multicarrier signal formed by a temporal succession of symbols comprising a set of data elements, each of said data elements modulating a carrier frequency of the signal, said data elements comprising firstly reference data elements called pilots, a value at transmission of at least certain of said pilots being known to at least one receiver designed to carry out a reception of said signal and secondly informative data elements, a value at transmission of said informative data elements being not known a priori to said receiver or receivers, one of said carrier frequencies modulated at a given instant by one of said data elements being called a carrier, wherein the device comprises:

means of computation of an interference affecting a set of at least two data elements to be protected, said data elements to be protected being spaced out two by two from at most one carrier in time and at most one carrier in frequency, said interference taking account of the value of said data elements to be protected and of the values of the data elements of a contour ring constituted by said carriers that are immediately adjacent to said data elements to be protected; and means of determining at least one value to be assigned to at least one data element of said contour ring, to reduce said computed interference at reception.

9. Device for reception of a multicarrier signal formed by a temporal succession of symbols comprising a set of data elements, each of said data elements modulating a carrier frequency of the signal, said data elements comprising firstly reference data elements called pilots, a value at transmission of at least certain of said pilots being known to at least one receiver designed to carry out a reception of said signal and secondly informative data elements, a value at transmission of said informative data elements being not known a priori to said receiver or receivers, one of said carrier frequencies modulated at a given instant by one of said data elements being called a carrier, wherein said received signal comprises at least two data elements to be protected, said data elements being spaced out two by two from at most one carrier in time and at most one carrier in frequency, a processing operation being done before transmission on said signal so as to assign at least one value to at least one data element of a contour ring constituted by said carriers that are immediately adjacent to said data elements to be protected to reduce an interference affecting said data elements to be protected, and wherein said device comprises:

means of estimation of a transfer function of a transmission channel, from at least certain of said data elements to be protected; and means of retrieval of said data elements of said contour ring implementing a processing that is the reverse of the processing done before transmission.

10. A non-transitory computer-readable memory comprising a computer program product stored thereon and executable by a microprocessor, the computer program product comprising program code instructions which, when executed perform a method for transmission of a multicarrier signal formed by a temporal succession of symbols comprising a set of data elements, each of said data elements modulating a carrier frequency of said signal, said data elements comprising firstly reference data elements called pilots, a value at transmission of at least certain of said pilots being known to at least one receiver designed to carry out a reception of this signal and secondly informative data elements, a value at transmission of said informative data elements being not known a priori to said receiver or receivers, one of said carrier frequencies modulated at a given instant by one of said data elements being called a carrier, wherein the method comprises:

computing an interference affecting a set of at least two data elements to be protected, said data elements to be protected being spaced out two by two from at most one carrier in time and at most one carrier in frequency, said interference taking account of the value of said data elements to be protected and of the values of the data elements of a contour ring constituted by said carriers that are immediately adjacent to said data elements to be protected; and determining at least one value to be assigned to at least one data element of said contour ring, to reduce said computed interference at reception.

11. A non-transitory computer-readable memory comprising a computer program product stored thereon and executable by a microprocessor, the computer program product comprising program code instructions which, when executed, perform a method of receiving a multicarrier signal formed by a temporal succession of symbols comprising a set of data elements, each of said data elements modulating a carrier frequency of said signal, said data elements comprising firstly reference data elements called pilots, a value at transmission of at least certain of said pilots being known to at least one receiver designed to carry out a reception of said signal and secondly informative data elements, a value at transmission of said informative data elements being not known a priori to said receiver or receivers, one of said carrier frequencies modulated at a given instant by one of said data elements being called a carrier, wherein said received signal comprising at least two data elements to be protected, said data elements being spaced out two by two from at most one carrier in time and at most one carrier in frequency, a processing operation being done before transmission on the signal so as to assign at least one value to at least one data element of a contour ring constituted by said carriers that are immediately adjacent to the data elements to be protected to reduce an interference affecting said data elements to be protected, said method comprising:

estimating a transfer function of a transmission channel, from at least certain of said data elements to be protected; and retrieving said data elements of said contour ring implementing a processing that is the reverse of said processing done before transmission.

\* \* \* \* \*